(12) United States Patent
Halla et al.

(10) Patent No.: US 8,380,127 B2
(45) Date of Patent: Feb. 19, 2013

(54) PLURALITY OF MOBILE COMMUNICATION DEVICES FOR PERFORMING LOCALLY COLLABORATIVE OPERATIONS

(75) Inventors: Brian L. Halla, Saratoga, CA (US); Michael Polacek, Pescadero, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 1058 days.

(21) Appl. No.: 12/260,774

(22) Filed: Oct. 29, 2008

(65) Prior Publication Data
US 2010/0105325 A1   Apr. 29, 2010

(51) Int. Cl.
*H04B 7/00* (2006.01)
(52) U.S. Cl. ....... 455/41.2; 455/419; 455/41.3; 455/502
(58) Field of Classification Search .................. 455/566, 455/550.1, 551, 552.1, 567, 90.1, 456.1, 455/456.2, 418, 419, 420, 41.1, 41.2, 41.3, 455/502, 503, 517, 520, 67.11, 68; 709/224, 709/203; 700/295; 707/200, 291
See application file for complete search history.

(56) References Cited

U.S. PATENT DOCUMENTS

| | | | |
|---|---|---|---|
| 6,067,566 A | 5/2000 | Moline | |
| 6,175,872 B1 | 1/2001 | Neumann et al. | |
| 6,482,087 B1 | 11/2002 | Egozy et al. | |
| 6,527,641 B1 | 3/2003 | Sinclair et al. | |
| 6,653,545 B2 | 11/2003 | Redmann et al. | |
| 6,793,580 B2 | 9/2004 | Sinclair et al. | |
| 6,898,637 B2 | 5/2005 | Curtin | |

(Continued)

FOREIGN PATENT DOCUMENTS
WO   WO2008/085743   7/2008

OTHER PUBLICATIONS
International Search Report for International Application No. PCT/US2009/062476, 3 pages.

(Continued)

*Primary Examiner* — John J Lee
(74) *Attorney, Agent, or Firm* — Steven A. Shaw; W. James Brady; Frederick J. Telecky, Jr.

(57) ABSTRACT

A plurality of mobile communication devices for performing one or more locally collaborative operations. In one embodiment, one of the mobile communication devices provides a first local energy emission and, related thereto, a local wireless transmission signal, while another of the mobile communication devices responds to the local wireless transmission signal by providing a second local energy emission related to the first local energy emission. In another embodiment, one of the mobile communication devices receives a local stimulus, exclusive of vocal energy emitted by a user, and in response thereto provides a local wireless transmission signal, while another of the mobile communication devices responds to the local wireless transmission signal by providing a local energy emission related to the local stimulus. In another embodiment, each of the mobile communication devices receives a respective portion of a local stimulus in response to which at least one of the mobile communication devices transmits a local wireless transmission signal in response to which a second one of the mobile communication devices provides a local energy emission related to responses to the local stimulus in addition to its own. In additional embodiments, each of the mobile communication devices receives a respective portion of a local stimulus and in response thereto transmits a wireless transmission signal for collaboratively providing, to a remotely located system, information about the various responses to the local stimulus.

5 Claims, 6 Drawing Sheets

U.S. PATENT DOCUMENTS

| | | | |
|---|---|---|---|
| 7,149,549 B1 | 12/2006 | Ortiz et al. | |
| 7,167,182 B2 | 1/2007 | Butler | |
| 7,376,388 B2 * | 5/2008 | Ortiz et al. | 455/3.06 |
| 2004/0067752 A1 * | 4/2004 | Himmelstein | 455/422.1 |
| 2011/0275418 A1 * | 11/2011 | Forstall et al. | 455/566 |

OTHER PUBLICATIONS

Written Opinion for International Application No. PCT/US2009/062476, 5 pages.

* cited by examiner

PLURALITY OF MOBILE COMMUNICATION DEVICES FOR PERFORMING LOCALLY COLLABORATIVE OPERATIONS

BACKGROUND

1. Field of the Invention

The present invention relates to wireless communication devices, and in particular, to mobile communication devices capable of performing locally collaborative operations.

2. Related Art

A mobile communication device, such as a cellular telephone or other handheld or otherwise portable device capable of wireless communications (including, without limitation, telephony or Internet access) and local processing or display functions, operates in many ways as a node in a powerful wireless network where the network power increases multiplicatively as the number of nodes in the network increases. For example, a typical mobile telephone includes a computer, a display, a wireless transceiver, one or more acoustic output transducers (e.g., speakers), and one or more input acoustic transducers (e.g., microphones). With such computing, processing and communication capabilities available, it would be desirable to provide for performances of more operations than simply initiating and receiving telephone calls, sending and receiving text messages, or accessing the Internet.

SUMMARY OF THE INVENTION

In accordance with the presently claimed invention, a plurality of mobile communication devices is provided for performing one or more locally collaborative operations. In one embodiment, one of the mobile communication devices provides a first local energy emission and, related thereto, a local wireless transmission signal, while another of the mobile communication devices responds to the local wireless transmission signal by providing a second local energy emission related to the first local energy emission. In another embodiment, one of the mobile communication devices receives a local stimulus, exclusive of vocal energy emitted by a user, and in response thereto provides a local wireless transmission signal, while another of the mobile communication devices responds to the local wireless transmission signal by providing a local energy emission related to the local stimulus. In another embodiment, each of the mobile communication devices receives a respective portion of a local stimulus in response to which at least one of the mobile communication devices transmits a local wireless transmission signal in response to which a second one of the mobile communication devices provides a local energy emission related to responses to the local stimulus in addition to its own. In additional embodiments, each of the mobile communication devices receives a respective portion of a local stimulus and in response thereto transmits a wireless transmission signal for collaboratively providing, to a remotely located system, information about the various responses to the local stimulus.

In accordance with one embodiment of the presently claimed invention, a plurality of mobile communication devices is provided for performing one or more locally collaborative operations, wherein each one of the plurality of mobile communication devices includes:

wireless communication circuitry responsive to
one or more local wireless transmission signals from at least another of the plurality of mobile communication devices by providing one or more incoming local communication signals, and
one or more outgoing local communication signals by providing one or more local wireless transmission signals for reception by at least another of the plurality of mobile communication devices;

processing circuitry coupled to the wireless communication circuitry and responsive at least one of the one or more incoming local communication signals and one or more input signals by providing at least one or more output signals and the one or more outgoing local communication signals; and input/output circuitry coupled to the processing circuitry and responsive to at least one of one or more local stimuli and the one or more output signals by providing at least one of the one or more input signals and one or more local energy emissions;

wherein
a first one of the plurality of mobile communication devices provides a first one of the one or more local energy emissions and, related thereto, a first one of the one or more local wireless transmission signals, and
a second one of the plurality of mobile communication devices responds to the first one of the one or more local wireless transmission signals by providing a second one of the one or more local energy emissions related to the first one of the one or more local energy emissions.

In accordance with another embodiment of the presently claimed invention, a plurality of mobile communication devices is provided for performing one or more locally collaborative operations, wherein each one of the plurality of mobile communication devices includes:

wireless communication circuitry responsive to
one or more local wireless transmission signals from at least another of the plurality of mobile communication devices by providing one or more incoming local communication signals, and
one or more outgoing local communication signals by providing one or more local wireless transmission signals for reception by at least another of the plurality of mobile communication devices;

processing circuitry coupled to the wireless communication circuitry and responsive at least one of the one or more incoming local communication signals and one or more input signals by providing at least one of one or more output signals and the one or more outgoing local communication signals; and input/output circuitry coupled to the processing circuitry and responsive to at least one of one or more local stimuli and the one or more output signals by providing at least one of the one or more input signals and one or more local energy emissions;

wherein
a first one of the plurality of mobile communication devices receives a first one of the one or more local stimuli, exclusive of vocal energy emitted by a user, and in response thereto provides a first one of the one or more local wireless transmission signals, and
a second one of the plurality of mobile communication devices responds to the first one of the one or more local wireless transmission signals by providing a first one of the one or more local energy emissions related to the first one of the one or more local stimuli.

In accordance with another embodiment of the presently claimed invention, a plurality of mobile communication devices is provided for performing one or more locally collaborative operations, wherein each one of the plurality of mobile communication devices includes:

wireless communicator means for
receiving one or more local wireless transmission signals from at least another of the plurality of mobile communication devices and in response thereto providing one or more incoming local communication signals, and
receiving one or more outgoing local communication signals and in response thereto providing one or more local wireless transmission signals for reception by at least another of the plurality of mobile communication devices;
processor means for receiving at least one of the one or more incoming local communication signals and one or more input signals and in response thereto providing at least one of one or more output signals and the one or more outgoing local communication signals; and
input/output means for receiving at least one of one or more local stimuli and the one or more output signals and in response thereto providing at least one of the one or more input signals and one or more local energy emissions;
wherein
a first one of the plurality of mobile communication devices provides a first one of the one or more local energy emissions and, related thereto, a first one of the one or more local wireless transmission signals, and
a second one of the plurality of mobile communication devices responds to the first one of the one or more local wireless transmission signals by providing a second one of the one or more local energy emissions related to the first one of the one or more local energy emissions.

In accordance with another embodiment of the presently claimed invention, a plurality of mobile communication devices is provided for performing one or more locally collaborative operations, wherein each one of the plurality of mobile communication devices includes:
wireless communicator means for
receiving one or more local wireless transmission signals from at least another of the plurality of mobile communication devices and in response thereto providing one or more incoming local communication signals, and
receiving one or more outgoing local communication signals and in response thereto providing one or more local wireless transmission signals for reception by at least another of the plurality of mobile communication devices;
processor means for receiving at least one of the one or more incoming local communication signals and one or more input signals and in response thereto providing at least one of one or more output signals and the one or more outgoing local communication signals;
input/output means for receiving at least one of one or more local stimuli and the one or more output signals and in response thereto providing at least one of the one or more input signals and one or more local energy emissions;
wherein
a first one of the plurality of mobile communication devices receives a first one of the one or more local stimuli, exclusive of vocal energy emitted by a user, and in response thereto provides a first one of the one or more local wireless transmission signals, and
a second one of the plurality of mobile communication devices responds to the first one of the one or more local wireless transmission signals by providing a first one of the one or more local energy emissions related to the first one of the one or more local stimuli.

In accordance with another embodiment of the presently claimed invention, a plurality of mobile communication devices is provided for performing one or more locally collaborative operations, wherein each one of the plurality of mobile communication devices includes:
wireless communication circuitry responsive to
one or more local wireless transmission signals from at least another of the plurality of mobile communication devices by providing one or more incoming local communication signals, and
one or more outgoing local communication signals by providing one or more local wireless transmission signals for reception by at least another of the plurality of mobile communication devices;
processing circuitry coupled to the wireless communication circuitry and responsive to at least one of the one or more incoming local communication signals and one or more input signals by providing at least one of one or more output signals and the one or more outgoing local communication signals;
input/output circuitry coupled to the processing circuitry and responsive to at least one of one or more local stimuli and the one or more output signals by providing at least one of the one or more input signals and one or more local energy emissions; and
wherein
a first one of the plurality of mobile communication devices responds to at least a first portion of the one or more local stimuli by providing a first one of the one or more local wireless transmission signals, and
a second one of the plurality of mobile communication devices responds to at least a second portion of the one or more local stimuli and at least the first one of the one or more local wireless transmission signals by providing a first one of the one or more local energy emissions.

In accordance with another embodiment of the presently claimed invention, a plurality of mobile communication devices is provided for performing one or more locally collaborative operations, wherein each one of the plurality of mobile communication devices includes:
wireless communication circuitry responsive to
one or more local wireless transmission signals from at least another of the plurality of mobile communication devices by providing one or more incoming local communication signals,
one or more outgoing local communication signals by providing one or more local wireless transmission signals for reception by at least another of the plurality of mobile communication devices, and
one or more outgoing remote communication signals by providing one or more remote wireless transmission signals for reception by a receiver located remotely from the plurality of mobile communication devices;
processing circuitry coupled to the wireless communication circuitry and responsive to at least one of the one or more incoming local communication signals and one or more input signals by providing at least one of one or more output signals, the one or more outgoing remote communication signals and the one or more outgoing local communication signals;
input/output circuitry coupled to the processing circuitry and responsive to at least one of one or more local stimuli and the one or more output signals by providing at least one of the one or more input signals and one or more local energy emissions; and
wherein
a first one of the plurality of mobile communication devices responds to a first portion of the one or more local stimuli and at least a first one of the one or more local wireless transmission signals by providing a second one of the one or more local wireless transmission signals and a first one of the one or more remote wireless transmission signals, a second one of the plurality of mobile communication devices responds to a second portion of the one or more local stimuli and at least the second one of the one or more local wireless transmission signals by providing the first one of the one or more local wireless transmission signals and a second one of the one or more remote wireless transmission signals, the first one of the one or more remote wireless transmission signals is related to at least a sub-portion of the first portion of the one or more local stimuli, and the second one of the one or more remote wireless transmission signals is related to at least a sub-portion of the second portion of the one or more local stimuli.

In accordance with another embodiment of the presently claimed invention, a plurality of mobile communication devices is provided for performing one or more locally collaborative operations, wherein each one of the plurality of mobile communication devices includes:

wireless communicator means for receiving one or more local wireless transmission signals from at least another of the plurality of mobile communication devices and in response thereto providing one or more incoming local communication signals, and receiving one or more outgoing local communication signals and in response thereto providing one or more local wireless transmission signals for reception by at least another of the plurality of mobile communication devices;

processor means for receiving at least one of the one or more incoming local communication signals and one or more input signals and in response thereto providing at least one of one or more output signals and the one or more outgoing local communication signals; and input/output means for receiving at least one of one or more local stimuli and the one or more output signals and in response thereto providing at least one of the one or more input signals and one or more local energy emissions;

wherein a first one of the plurality of mobile communication devices receives at least a first portion of the one or more local stimuli and in response thereto provides a first one of the one or more local wireless transmission signals, and a second one of the plurality of mobile communication devices receives at least a second portion of the one or more local stimuli and at least the first one of the one or more local wireless transmission signals and in response thereto provides a first one of the one or more local energy emissions.

In accordance with another embodiment of the presently claimed invention, a plurality of mobile communication devices is provided for performing one or more locally collaborative operations, wherein each one of the plurality of mobile communication devices includes:

wireless communicator means for receiving one or more local wireless transmission signals from at least another of the plurality of mobile communication devices and in response thereto providing one or more incoming local communication signals, receiving one or more outgoing local communication signals and in response thereto providing one or more local wireless transmission signals for reception by at least another of the plurality of mobile communication devices, and receiving one or more outgoing remote communication signals and in response thereto providing one or more remote wireless transmission signals for reception by a receiver located remotely from the plurality of mobile communication devices;

processor means for receiving at least one of the one or more incoming local communication signals and one or more input signals and in response thereto providing at least one of one or more output signals, the one or more outgoing remote communication signals and the one or more outgoing local communication signals; and input/output means for receiving at least one of one or more local stimuli and the one or more output signals and in response thereto providing at least one of the one or more input signals and one or more local energy emissions;

wherein a first one of the plurality of mobile communication devices receives a first portion of the one or more local stimuli and at least a first one of the one or more local wireless transmission signals and in response thereto provides a second one of the one or more local wireless transmission signals and a first one of the one or more remote wireless transmission signals, a second one of the plurality of mobile communication devices receives a second portion of the one or more local stimuli and at least the second one of the one or more local wireless transmission signals and in response thereto provides the first one of the one or more local wireless transmission signals and a second one of the one or more remote wireless transmission signals, the first one of the one or more remote wireless transmission signals is related to at least a sub-portion of the first portion of the one or more local stimuli, and the second one of the one or more remote wireless transmission signals is related to at least a sub-portion of the second portion of the one or more local stimuli.

In accordance with another embodiment of the presently claimed invention, a plurality of mobile communication devices is provided for performing one or more collaborative operations, wherein each one of the plurality of mobile communication devices includes:

wireless communication circuitry responsive to one or more local wireless transmission signals from at least another of the plurality of mobile communication devices by providing one or more incoming local communication signals, one or more outgoing local communication signals by providing one or more local wireless transmission signals for reception by at least another of the plurality of mobile communication devices, one or more remote wireless transmission signals from a transmitter located remotely from the plurality of mobile communication devices by providing one or more incoming remote communication signals, and one or more outgoing remote communication signals by providing one or more remote wireless transmission signals for reception by a receiver located remotely from the plurality of mobile communication devices;

processing circuitry including memory circuitry, coupled to the wireless communication circuitry and responsive to at least one of the one or more incoming local communication signals and one or more input signals by providing at least one of one or more output signals and the one or more outgoing local communication signals; and input/output circuitry including at least one sensor, coupled to the processing circuitry and responsive to at least one of one or more local stimuli, including sensing of at least one local environmental characteristic, and the one or more output signals by providing at least one of the one or more input signals and one or more local energy emissions;

wherein each one of at least a portion of the plurality of mobile communication devices is responsive to one or more of preprogrammed data corresponding to one or more predetermined locations, preprogrammed data corresponding to one or more predetermined times, reception of a respective one or more of the one or more local wireless transmission signals, reception of a respective one or more of the one or more remote wireless transmission signals, and sensing of a predetermined one or more of the at least one of one or more local stimuli, by capturing stimuli data corresponding to the predetermined one or more of the at least one of one or more local stimuli and initiating one or more of another respective one or more of the one or more local wireless transmission signals, and another respective one or more of the one or more remote wireless transmission signals.

In accordance with another embodiment of the presently claimed invention, a plurality of mobile communication devices is provided for performing one or more collaborative operations, wherein each one of the plurality of mobile communication devices includes:

wireless communicator means for receiving one or more local wireless transmission signals from at least another of the plurality of mobile communication devices and in response thereto providing one or more incoming local communication signals, receiving one or more outgoing local communication signals and in response thereto providing one or more local wireless transmission signals for reception by at least another of the plurality of mobile communication devices, receiving one or more remote wireless transmission signals from a transmitter located remotely from the plurality of mobile communication devices and in response thereto providing one or more incoming remote communication signals, and receiving one or more outgoing remote communication signals and in response thereto providing one or more remote wireless transmission signals for reception by a receiver located remotely from the plurality of mobile communication devices;

processor means, including memory means, for receiving at least one of the one or more incoming local communication signals and one or more input signals and in response thereto providing at least one of one or more output signals and the one or more outgoing local communication signals; and input/output means, including sensor means, for receiving at least one of one or more local stimuli, including sensing of at least one local environmental characteristic, and the one or more output signals and in response thereto providing at least one of the one or more input signals and one or more local energy emissions;

wherein each one of at least a portion of the plurality of mobile communication devices is responsive to one or more of preprogrammed data corresponding to one or more predetermined locations, preprogrammed data corresponding to one or more predetermined times, reception of a respective one or more of the one or more local wireless transmission signals, reception of a respective one or more of the one or more remote wireless transmission signals, and sensing of a predetermined one or more of the at least one of one or more local stimuli, by capturing stimuli data corresponding to the predetermined one or more of the at least one of one or more local stimuli and initiating one or more of another respective one or more of the one or more local wireless transmission signals, and another respective one or more of the one or more remote wireless transmission signals.

DETAILED DESCRIPTION

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described function. Additionally, the term "signal" may refer to one or more currents, one or more voltages, or a data signal. Within the drawings, like or related elements will have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed.

As described in more detail below, multiple mobile telephones perform locally collaborative operations by treating each mobile telephone as a node in a network, with each node capable of being accessed by any other such node that is in sufficiently close proximity to allow signal communications among at least some of the nodes forming the network. Resulting functions include local and remote control of the video display, speakers and microphones, as well as collaborative execution of one or more common programs or functions by the computers within the mobile telephones forming the locally collaborative network.

The following discussion is presented in the context of an application of the presently claimed invention in and with mobile telephones, such as cellular telephones. However, it should be readily understood by one of ordinary skill in the art that the presently claimed invention can also be applied to virtually any mobile communication device having many if not all of the basic functional elements of a modern mobile telephone, including, without limitation, a computer, a visual (e.g., video) display, one or more wireless transceivers (e.g., radio frequency or infrared), one or more acoustic output transducers (e.g., speakers), one or more input acoustic transducers (e.g., microphones), and a light projector (e.g., visible light, infrared, ultraviolet or laser).

Figure 1:
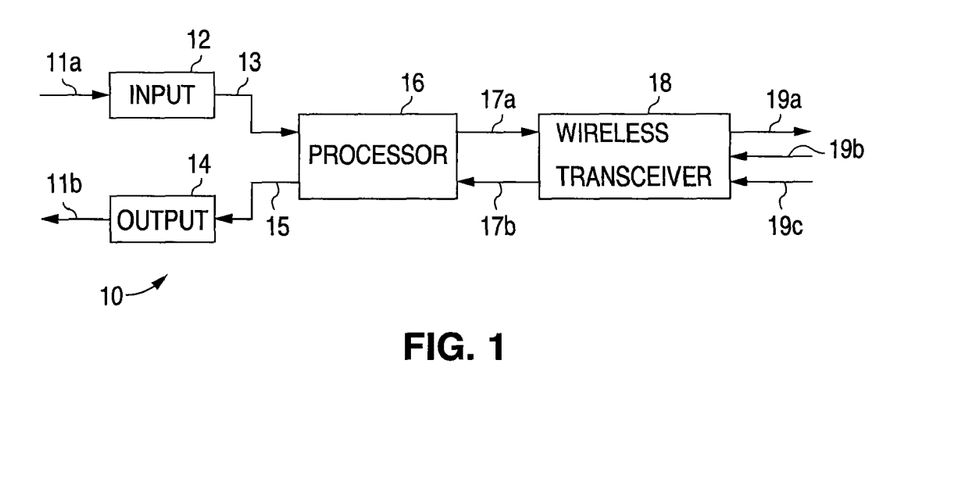
FIG. 1 is a functional block diagram of the major elements of one of a plurality of mobile telephones in accordance with one embodiment of the presently claimed invention.

Referring to FIG. 1, as discussed in more detail below, each mobile telephone among a group of mobile telephones in accordance with one embodiment of the presently claimed invention includes input circuitry 12, output circuitry 14, processor circuitry 16 and wireless transceiver circuitry 18, interconnected substantially as shown. The input circuitry 12 receives local stimuli 11a (e.g., emissions of vocal energy or keypad inputs by the user, sensations caused by sensing of local environmental characteristics, or instructions or data associated with local execution of a program) in response to which it provides one or more input signals 13. The output circuitry 14, in response to output signals 15 from the processor circuitry 16, provides local energy emissions 11b (e.g., emissions of acoustic energy, visible light or a video display). The processor circuitry 16 provides outgoing communication signals 17a and receives incoming communication signals 17b, which are related to the input signals 13 and output signals 15, respectively. The wireless transceiver circuitry 18 transmits and receives wireless transmission signals 19a, 19b, which are related to the outgoing 17a and incoming 17b communication signals, respectively, and also receives wireless positioning signals 19c, e.g., as transmitted by satellites as part of a global positioning system (GPS).

Figure 2:
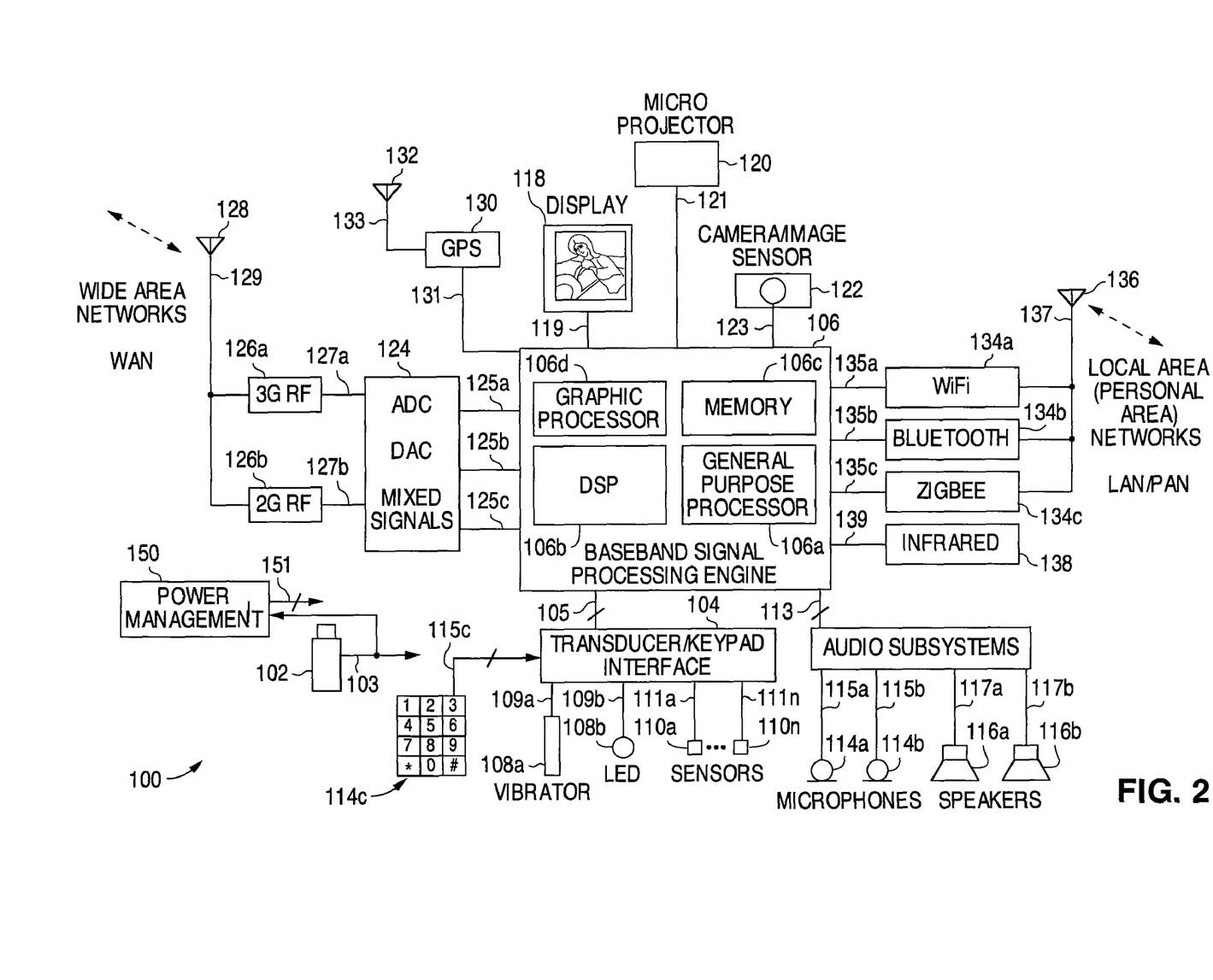
FIG. 2 depicts in greater detail the elements of FIG. 1.

Referring to FIG. 2, in accordance with one example embodiment 100 of the presently claimed invention, the elements of the system 10 of FIG. 1 can be implemented as follows. The processor circuitry 16 can be implemented as a baseband signal processing engine 106, which includes a general purpose processor 106a, a digital signal processor (DSP) 106b, memory 106c and a graphics processor 106d, all of which communicate and interact with each other in accordance with well known principles.

The wireless transceiver circuitry 18 can be implemented as interface circuitry 124, radio frequency (RF) communications circuitry 126a, 126b and an antennae 128 for communicating via a wide area network (WAN). Also included can be GPS positioning circuitry 130 and an antenna 132 for receiving satellite signals. Further included can be any or all of "wireless fidelity" (Wi-Fi) circuitry 134a, Bluetooth circuitry 134b, Zigbee circuitry 134c and an antenna 136, plus infrared (IR) circuitry 138 for communicating via a local area network (LAN) or personal area network (PAN).

The input circuitry 12 can be implemented using part of transducer and keypad interface circuitry 104, sensors 110a, . . . , 110n, part of audio subsystem circuitry 112, microphones 114a, 114b, a keypad 114c and an image sensor (e.g., camera) 122. The output circuitry 14 can be implemented using part of the transducer and keypad interface circuitry 104, an electromechanical vibrator 108a, a light emitting diode (LED) 108b, part of the audio subsystem circuitry 112, speakers 116a, 116b, a video display 118 and a micro projector 120.

A battery 102, which provides power for this system 100, has its voltage 103 monitored by power management circuitry 150, which provides power management control signals 151 for selected portions 104, 106, 106a, 106b, 106c, 106d, 112, 118, 120, 122, 124, 126a, 126b, 130, 134a, 134b, 134c, 138 of the system 100 as desired.

The audio subsystem circuitry 112 receives incoming acoustic signals 115a, 115b from the microphones 114a, 114b and provides outgoing acoustic signals 117a, 117b for the speakers 116a, 116b. The speakers 116a, 116b can be mounted within the housing (not shown) of the system 100, or can be in the form of one or more earpieces for private listening by the user. The incoming 115a, 115b and outgoing 117a, 117b acoustic signals are conveyed as part of a group of signals 113 communicated between the audio subsystem circuitry 112 and the processing engine 106.

The keypad 114c allows for manual data entry by the user. Currently, such keypads are typically implemented as a dedicated set of electromechanical pushbutton switches to be manipulated by a user's fingers, or as a virtual keyboard formed by virtual buttons on a touchscreen displayed on the video display 118 to be manipulated by a user's fingers or a stylus. However, it will be readily appreciated that the role of the keypad 114c can also be fulfilled through the use of voice recognition software, e.g., executed by the processing engine 106 to process aural user commands received via the microphones 114a, 114b, conveyed as acoustic signals 115a, 115b, 113 via the audio subsystem circuitry 112. Visual signals 119, 121, 123 are communicated between the processing engine 106 and the display 118, micro projector 120 and image sensor 122.

Satellite signals are received via the antenna 132, which provides the received signals 133 to the GPS circuitry 130. In turn, the GPS circuitry 130 provides appropriately converted signals 131 to the processing engine 106.

Remote wireless communication via a WAN is achieved by communicating RF signals via the antenna 128. Incoming and outgoing signals are conveyed via a transmission line 129 between the antenna 128 and the RF circuitry 126a, 126b. Outgoing and incoming signals 127a, 127b for conversion by or that have been converted by the RF circuitry 126a, 126b are further converted by the baseband circuitry 124 (e.g., analog-to-digital or digital-to-analog conversion). Corresponding digital 125a, analog 125b or mixed 125c baseband signals are communicated to and from the processing engine 106. The RF signals communicated via the antenna 128 can also be used to determine the location (e.g., geographical) or position (e.g., relative to another location) of the system 10 in accordance with well known techniques, e.g., by using signals received from multiple infrastructure transceivers (not shown) to compute the position of the system 10 relative to the known locations of such transceivers based upon signal timing, signal strength, transceiver locations data, etc.

Local wireless communication via a LAN or a PAN is achieved via the antenna 136 which communicates the RF signals 137 to and from the Wi-Fi 134a, Bluetooth 134b or Zigbee 134c circuitry. Corresponding baseband signals 135a, 135b, 135c are communicated to and from the processing engine 106. Additional LAN or PAN communication can be achieved via the IR circuitry 138 (which would include one or more IR sensors for receiving IR signals and one or more IR emitters for transmitting IR signals), with corresponding baseband signals 139 communicated to and from the processing engine 106. Additionally, one or more of the baseband signals 135a, 135b, 135c, 139 can convey outgoing acoustic signals for communication to a wireless audio interface, e.g., a Bluetooth earpiece or headset.

As discussed in more detail below, the microphones 114a, 114b and speakers 116a, 116b provide an acoustic interface, incoming and outgoing, with the user. Similarly, the display 118, micro projector 120 and image sensor 122 provide a visual interface, also outgoing and incoming, with the user. Location and position information can be communicated to the user either acoustically or visually. Further, various environmental conditions such as chemicals, gases (e.g., carbon monoxide, carbon dioxide, etc.), radiation, smoke, barometric pressure or temperature, as sensed by the sensors 110a, . . . , 110n, can also be communicated to the user either acoustically or visually, as well as be communicated to others via the WAN, LAN or PAN.

Figure 3A:
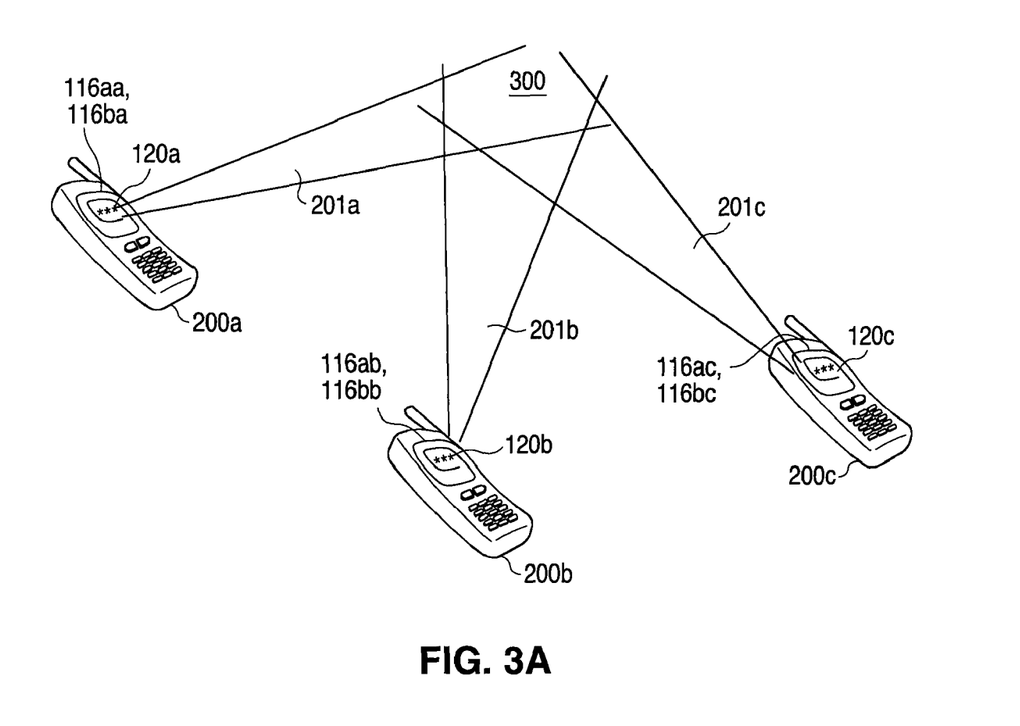
FIGS. 3A-3D illustrate example scenarios in which multiple mobile telephones are performing locally collaborative operations in accordance with various embodiments of the presently claimed invention.

Referring to FIG. 3A, a group of mobile telephones 200a, 200b, 200c can be used to perform a collaborative operation in which their respective micro projectors 120a, 120b, 120c collaboratively provide a focused light or video image 201a, 201b, 201c for projection onto a common surface or object 300. Alternatively, their respective speakers 116aa, 116ba, 116ab, 116bb, 116ac, 116bc can be driven collaboratively to form respective beams 201a, 201b, 201c of sound for projection to a common region 300.

Figure 3B:
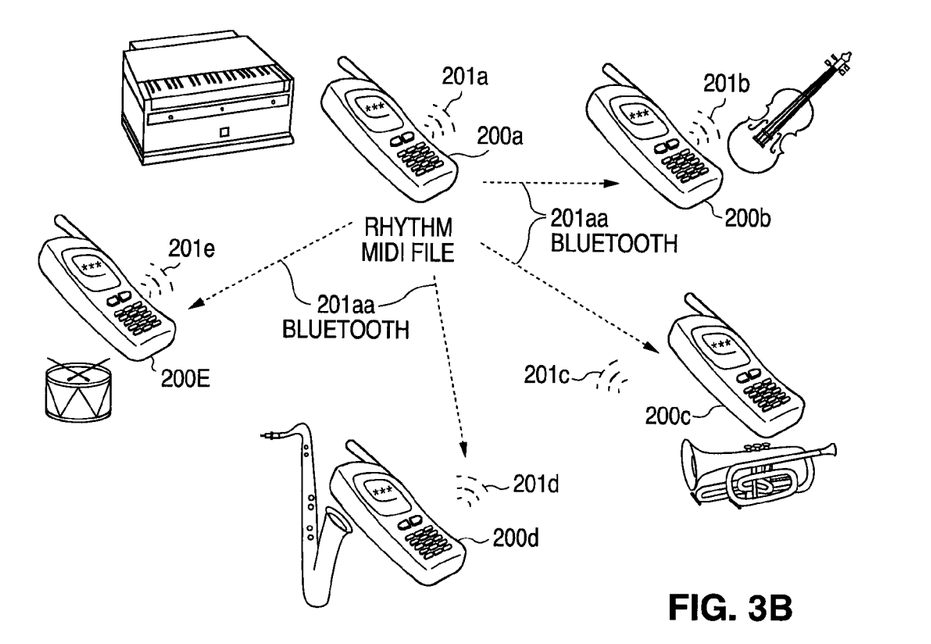

Referring to FIG. 3B, a group of mobile telephones 200a, 200b, 200c, 200d, 200e can be used to collaboratively provide music as a simulated musical group. For example, a master, or host, telephone 200a can execute a program in its processing engine 106 (FIG. 2) based on a musical instrument digital interface (MIDI), MPEG-1 Audio Layer (MP1, MP2, MP3), or other form of digital music data file stored in its memory 106c. The digital music data can be parsed into data corresponding to different instruments, such as string or wind instruments. This data can be communicated via a PAN signal 201aa, e.g., Bluetooth, to the other telephones 200b, 200c, 200d, 200e. In accordance with well known techniques, this signal 201 aa can be broadcast in a time division multiple access (TDMA) or code division multiple access (CDMA) format with musical data intended for each respective telephone 200b, 200c, 200d, 200e identified with appropriate address information. Using this parsed musical data, each telephone, including the host 200a, emits acoustic energy 201a, 201b, 201c, 201d, 201e via its respective speakers 116a, 116b (FIG. 2), thereby collaboratively providing music as a simulated musical group.

Figure 3C:
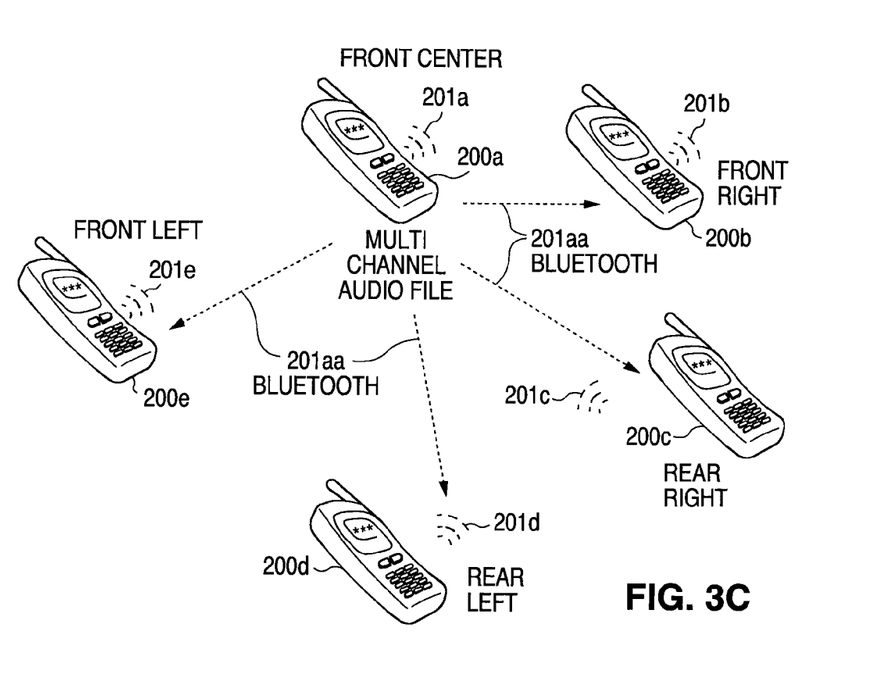

Referring to FIG. 3C, in a similar manner, the host telephone 201a can broadcast a signal 201aa (e.g., Bluetooth) to the other telephones 200b, 200c, 200d, 200e, with the audio data being transmitted corresponding to a multiple channel sound, such as that having a surround sound effect. For example, the host telephone 200a can emit acoustic energy 201a corresponding to the front center channel, while two additional telephones 200b, 200e emit acoustic energy 201b, 201e corresponding to front right and front left channels, and two additional telephones 200c, 200d emit acoustic energy 201c, 201d corresponding to rear right and rear left channels.

While the host 200a can be the primary provider of the MIDI file data, each user of the other telephones 200b, 200c, 200d, 200e can also use their respective keypads 114c (FIG. 2) to enhance or modify their respective acoustic emissions 201b, 201c, 201d, 201e to provide a different musical effect or power level. Additionally, the user of each telephone 200a, 200b, 200c, 200d, 200e can modify their respective acoustic emissions 201a, 201b, 201c, 201d, 201e by controlling motion of their respective telephone 200a, 200b, 200c, 200d, 200e as sensed by an internal acceleration sensor, such as a microelectromechanical systems (MEMS) sensor included as one of the sensors 10a, . . . , 110n (FIG. 2). For example, movement of a telephone as sensed by an acceleration sensor would have the effect of a wand manipulated by a musical conductor. Hence, physical motion of the telephones can be used as a user initiated input to modify the types of music or other characteristics of the sounds being emitted.

Figure 3D:
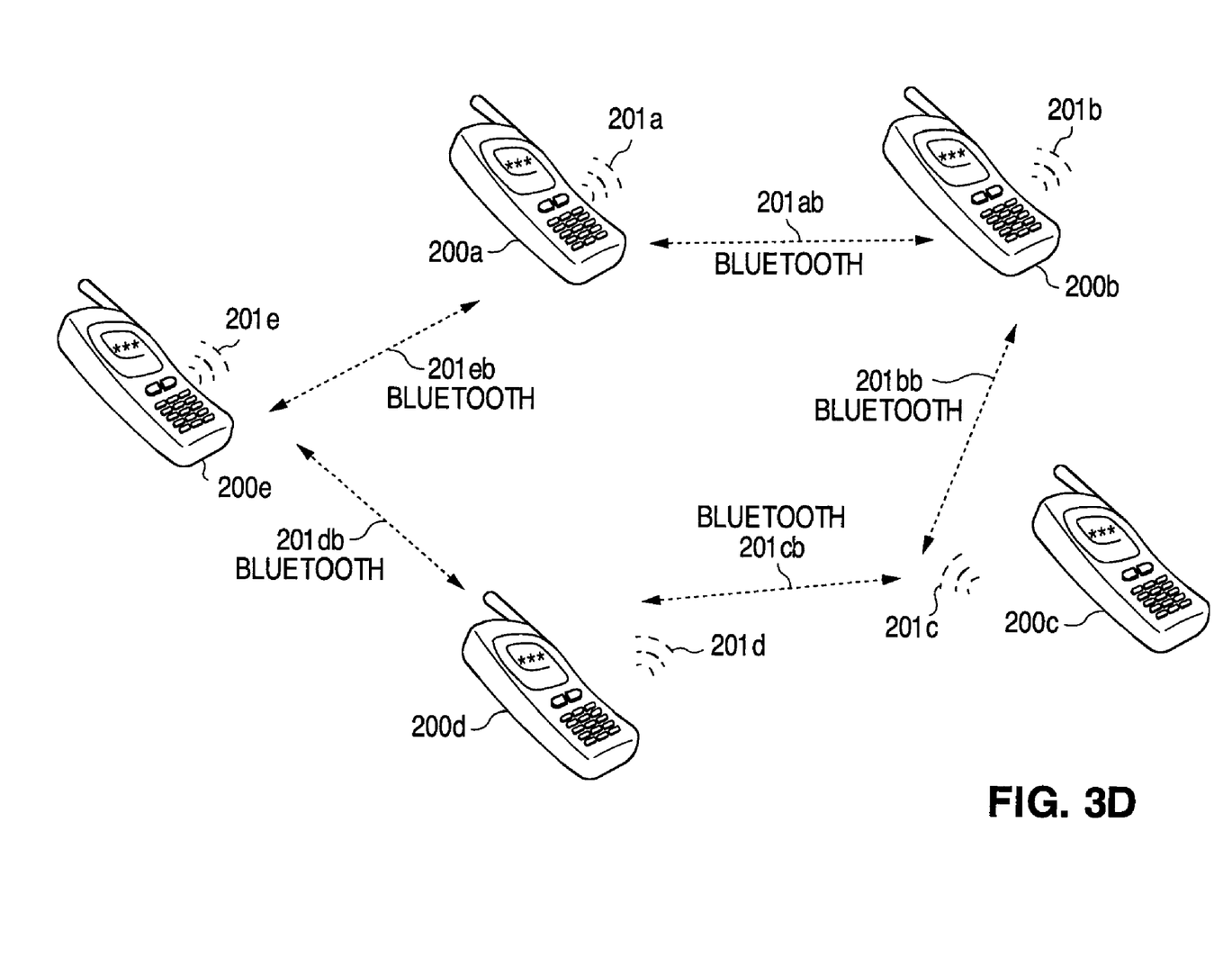

Referring to FIG. 3D, a group of telephones 200a, 200b, 200c, 200d, 200e can also operate collaboratively, e.g., as in a multiplayer game, in which multiple telephones communicate via respective PAN signals (e.g., Bluetooth) 201ab, 201bb, 201cb, 201db, 201eb with respective emissions of acoustic energy 201a, 201b, 201c, 201d, 201e as desired or appropriate. Of course, respective collaborative visual displays or projections would likely be desirable and appropriate as well.

Referring to FIGS. 4A-4D, a group of mobile telephones 200a, 200b can be used to respond to local stimuli in the form of a planar image (FIG. 4A), a three-dimensional object (FIG. 4B), an energy emission such as sound (FIG. 4C), and a local environmental characteristic (FIG. 4D) such as temperature or the presence of a chemical or gas. These examples depict the use of two devices, but it will be readily understood that virtually any number of devices can be used in accordance with the presently claimed invention.

Figure 4A:
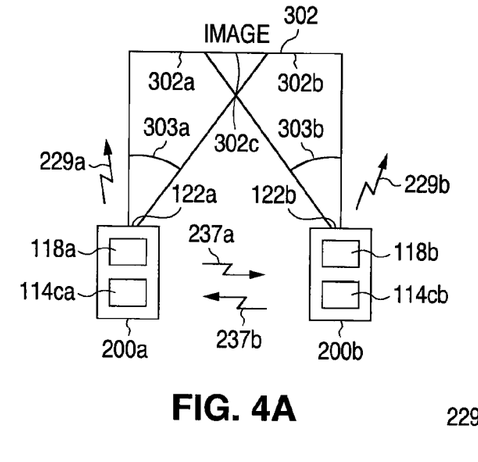
FIGS. 4A-4D illustrate example scenarios in which multiple mobile telephones are performing locally collaborative operations in accordance with further embodiments of the presently claimed invention.

Referring to FIG. 4A, for example, two devices 200a, 200b, using their camera/image sensors 122a, 122b (FIG. 2), capture image information about respective portions 302a, 302b of an image 302 via their respective fields of view 303a, 303b. The captured image information is converted by the camera/image sensors 122a, 122b to image signals for processing by the processing engine 106 (FIG. 2). The respective image information captured by each of the devices 200a, 200b can be mutually exchanged via local wireless communication signals 237a, 237b (e.g., Wi-Fi, Bluetooth, Zigbee or IR), thereby allowing each device 200a, 200b to display the entire image 302 on its respective video display 118a, 118b or as a two-dimensional or three-dimensional (e.g., holographic) projected image generated by its respective micro projector 120 (with appropriate correction or compensation for duplicate image information corresponding to the image area 302c common to both fields of a view 303a, 303b). Additionally, each device 200a, 200b can transmit a remote wireless communication signal 229a, 229b, e.g., as a RF signal to a cellular telephone system base station (not shown).

Figure 4B:
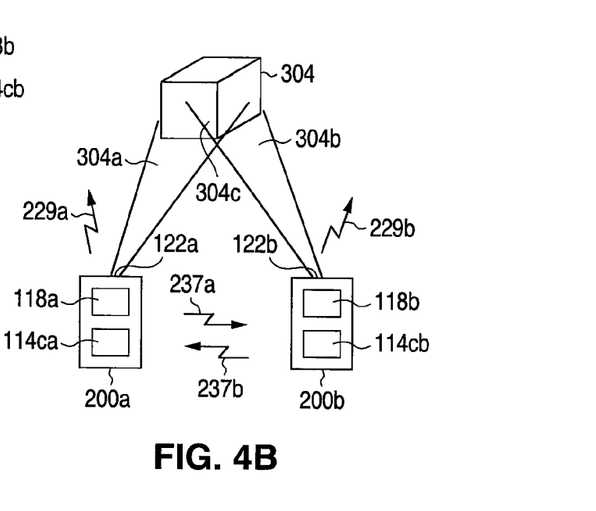

Referring to FIG. 4B, similar perceptions and displays of image information can be done for an object 304, with image information 304a, 304b corresponding to different views of the object 304 perceived by the different devices 200a, 200b, and the resulting collected image information exchanged via local wireless communication signals 237a, 237b, or transmitted for use or processing elsewhere via remote wireless communication signals 229a, 229b (again, with appropriate correction or compensation for duplicate image information 304c collected due to overlapping fields of view).

Figure 4C:
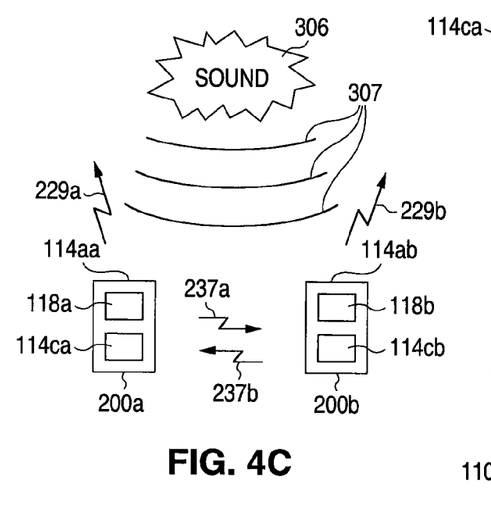

Referring to FIG. 4C, instead of image information, the devices can use their respective microphones 114aa, 114ab to capture acoustic energy 307 emitted from a sound source 306. As with the other examples, sound information captured by the various devices 200a, 200b can be mutually shared via local wireless communication signals 237a, 237b, or provided to a remote receive via remote wireless communication signals 229a, 229b. Such separate capturing of acoustic information can be advantageously used to capture the acoustic energy 307 in accordance with multiple channels (e.g., stereophonic or surround sound), or process the captured acoustic information 307 such that each device 200a, 200b performs frequency filtering so as to effectively capture and process different frequency ranges separately.

Figure 4D:
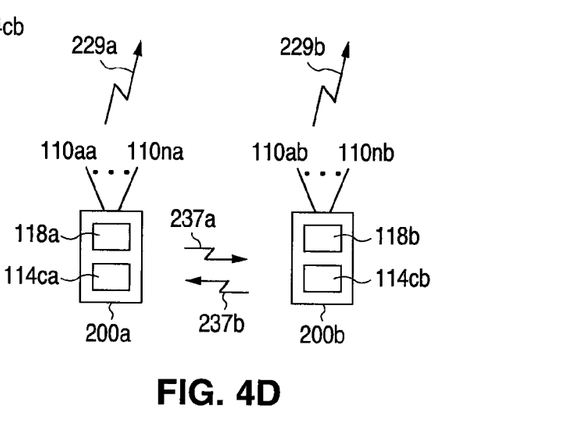

Referring to FIG. 4D, the mobile devices 200a, 200b can also use their respective sensors 10aa, . . . , 10na, 10ab, . . . , 10nb (FIG. 2) to sense local environmental characteristics (e.g., ambient temperature, the presence of a chemical or gas, radiation, smoke or barometric pressure).

As can be seen by this discussion of exemplary embodiments of the presently claimed invention, functional reciprocity is achieved with respect to the collaborative capabilities of mobile wireless communication devices. Multiple devices, while otherwise mutually independent physically and operationally of each other, can nonetheless operate collaboratively to emit energy in the form of a visible display (e.g., video or other form of a visual display), projected light (e.g., visible, infrared, ultraviolet, laser or other form of a visual experience) or mechanical vibration (e.g., audible, infrasonic, ultrasonic or other form of an acoustic experience), as well as respond to stimuli by capturing image information or vibrational (e.g., acoustic) energy, or sensing local environmental characteristics.

Figure 5:
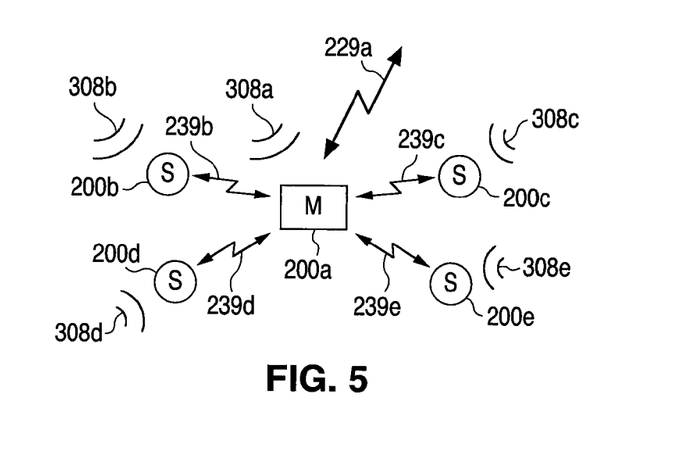
FIG. 5 illustrates an example scenario in which multiple mobile telephones collaboratively sense and report about one or more local environmental characteristics in accordance with another embodiment of the presently claimed invention.

Referring to FIG. 5, in accordance with another embodiment of the presently claimed invention, multiple devices 200a, 200b, 200c, 200d, 200e can be programmed to operate in a star network where one device 200a functions as the "master", while the remaining devices 200b, 200c, 200d, 200e function as "slaves". All devices 200a, 200b, 200c, 200d, 200e use one or more of their sensors 110a, . . . , 10n (FIG. 2) to sense a respective local environmental characteristic 308a, 308b, 308c, 308d, 308e. Information corresponding to these environmental characteristics are communicated via local wireless transmission signals 239b, 239c, 239d, 239e between the master 200a and slave 200b, 200c, 200d, 200e devices. The master device 200a communicates this information, along with information about its own sensed environmental characteristic 308a, via remote wireless transmission signals 229a, e.g., to a remote receiver, another device in another network or another device upstream within a larger network.

Along with information about the sensed environmental characteristics, each device can also include additional information, such as its respective location (e.g., geographical as determined by a GPS signal or its relative location within the network) or the time at which the environmental data was captured. In accordance with one embodiment, each device 200a, 200b, 200c, 200d, 200e can be preprogrammed as to the type of environmental data to be captured, what time such data capture is to be initiated, the frequency at which such data is to be captured, the geographic location for which such data is to be captured, the relative location within a network at which such data is to be captured, or other parameters as desired. Alternatively, as discussed in more detail below, this information concerning data capture can be provided to each device as it becomes a member of a network responsible for such data capture, or when such device enters a predetermined location in which such data capture is desired.

Figure 6:
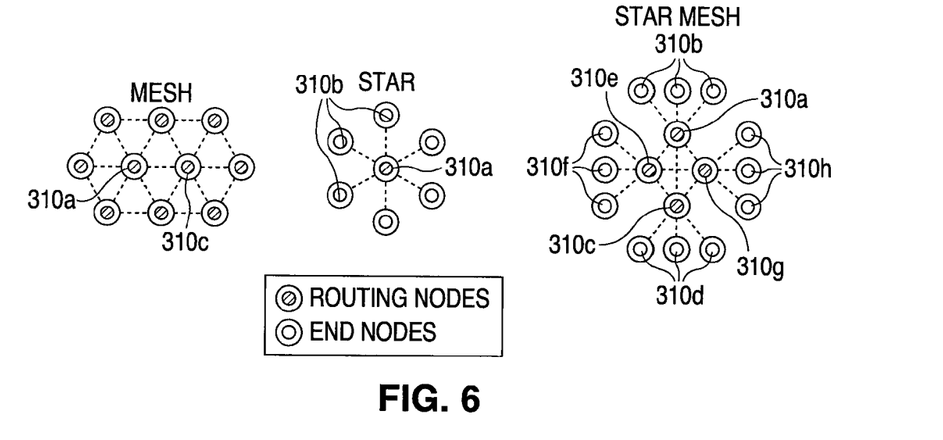
FIG. 6 illustrates multiple forms of networks in which multiple mobile telephones can collaborate in accordance with the presently claimed invention.

Referring to FIG. 6, multiple devices operating in a network, such as that depicted in FIG. 5, can operate in a number of types of networks. For example, a star network can be used (as in the example of FIG. 5) in which a designated device 310a operates as the master device and other devices 310b, operating as slave devices, report to the master device 310a. Alternatively, a mesh network can be used in which each device 310a, 310c communicate with each other and any other device located within a predetermined proximity within the overall network. Further alternatively, a combination of these networks, often called a star mesh network, can be used in which multiple master devices 310a, 310c, 310e, 310g can communicate directly with one another, while also serving as the master for respective slave devices 310b, 310d, 310f, 310h.

As will be readily appreciated, a star network offers simplicity in the sense that one central point of contact 310a can make it easier to communicate and coordinate from outside the network, as well as simplify decisions to be made by the slave units 310b as to when and with whom communications are to be shared. However, a full mesh network offers improved network reliability and predictability with automatic node joining and healing, as well as spatial diversity for communications, more democratic transfer of control with no fixed leadership necessary, or even multiple simultaneous leaders. Many advantages of both types can be realized with a star mesh network.

Figure 7:
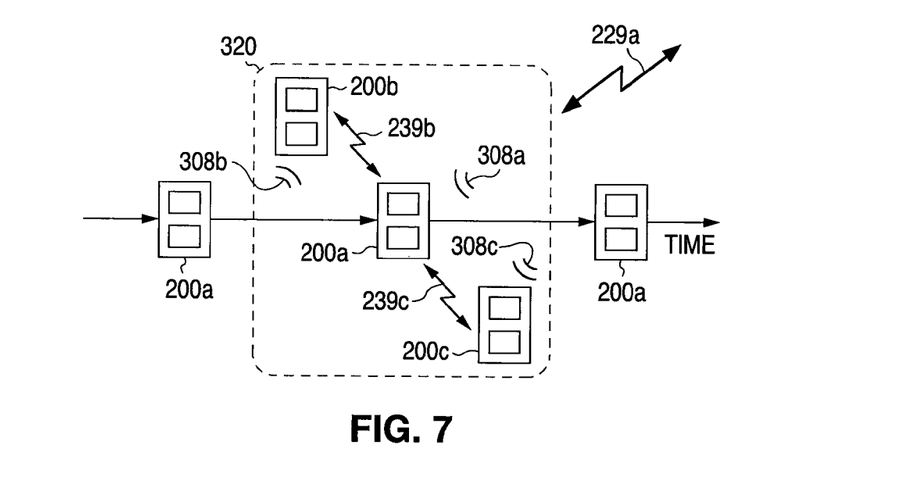
FIG. 7 illustrates an example of a mobile telephone entering into, operating within and exiting from a collaborative network of other mobile telephones in accordance with another embodiment of the presently claimed invention.

Referring to FIG. 7, in accordance with another embodiment of the presently claimed invention, a device 200a can be programmed to begin capturing sensor data corresponding to a local environmental characteristics 308a following its entry into a defined location 320. This unit 200a can communicate with other devices 200b, 200c, which are also sensing environmental characteristics 308b, 308c and capturing corresponding sensor data, via local wireless transmission signals 239b, 239c. Depending upon the type of network in use (FIG. 6), one or more of the devices 200a, 200b, 200c can communicate captured sensor data via remote wireless transmission signals 229a to a remote receiver, another device in another network or another device upstream within a larger network. As the device 200a exits the defined location 320, its sensing and capturing of environmental data can be programmed to terminate. Alternatively, rather than be preprogrammed to initiate its own sensing and capturing of environmental data, the unit 200a can be programmed to respond to the local wireless transmission signals 239b, 239c and in response thereto begin its sensing and capturing of environmental data, with such sensing and data capturing terminating upon exiting from the defined location 320, or upon failure to continuing receiving one or more of the local wireless transmission signals 239b, 239c.

In each of these examples, control by the user can be exercised via the keypad 114c or other user control mechanism (e.g., touchscreen or voice recognition, as discussed above) for correcting or compensating duplicate image information, selecting multi-channel processing or frequency filtering of collected acoustic information, video display of collected image information, audio playback of collected acoustic information, and local or remote communications of collected image, acoustic or environmental information.

Various other modifications and alternations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. A plurality of mobile communication devices for performing one or more locally collaborative operations for sensing a local environment and remote reception, wherein each one of said plurality of mobile communication devices comprises:
    wireless communication circuitry responsive to
        one or more local wireless transmission signals from at least another of said plurality of mobile communication devices by providing one or more incoming local communication signals, and
        one or more outgoing local communication signals by providing one or more local wireless transmission signals for reception by at least another of said plurality of mobile communication devices;
    processing circuitry coupled to said wireless communication circuitry and responsive to at least one of said one or more incoming local communication signals and one or more input signals by providing at least one of one or more output signals and said one or more outgoing local communication signals; and
    input/output circuitry coupled to said processing circuitry and responsive to at least one of one or more local stimuli and said one or more output signals by providing at least one of said one or more input signals and one or more local energy emissions;
    wherein
    a first one of said plurality of mobile communication devices receives a first one of said one or more local environmental characteristic stimuli, exclusive of sound energy emitted by the local environment, and in response thereto provides a first one of said one or more local wireless transmission signals, and
    a second one of said plurality of mobile communication devices responds to said first one of said one or more local wireless transmission signals by providing a first one of said one or more local energy emissions related to said first one of said one or more local environmental characteristic stimuli.

2. The plurality of mobile communication devices of claim 1, wherein said one or more local energy emissions comprises at least one of an emission of acoustic energy and an emission of visible light.

3. The plurality of mobile communication devices of claim 1, wherein said wireless communication circuitry comprises at least one of radio frequency (RF) transceiver circuitry and infrared (IR) transceiver circuitry.

4. The plurality of mobile communication devices of claim 1, wherein said input/output circuitry comprises at least one of:
    sensing circuitry, including at least one sensor, responsive to a sensing of the local environmental characteristic by providing said one or more input signals; and
    user input circuitry, including an alphanumeric keypad, responsive to one or more entries of a user as said one or more local stimuli by providing said one or more input signals.

5. The plurality of mobile communication devices of claim 1, wherein said processing circuitry comprises:
    memory circuitry to store a plurality of instructions; and
    computer circuitry coupled to said memory circuitry and responsive to said plurality of instructions by
        processing said one or more incoming local communication signals to provide said one or more output signals, and
        processing said one or more input signals to provide said one or more outgoing local communication signals.

* * * * *